Oct. 19, 1965 S. J. SHEHEEN 3,213,343
D.C. MOTOR SPEED CONTROL USING PULSE WIDTH MODULATION
Filed Aug. 15, 1962

SHAY J. SHEHEEN
INVENTOR

BY
ATTORNEY

United States Patent Office 3,213,343
Patented Oct. 19, 1965

3,213,343
D.C. MOTOR SPEED CONTROL USING PULSE WIDTH MODULATION
Shay J. Sheheen, Freeville, N.Y., assignor to The Raymond Corporation, Greene, N.Y., a corporation of New York
Filed Aug. 15, 1962, Ser. No. 218,211
4 Claims. (Cl. 318—341)

This invention relates to electric motor control systems, and more particularly, to improved stepless motor control systems for use with armature current controlled motors, such as the direct current series wound or compound wound motors commonly utilized with materials handling machinery such as lift trucks, hoists, cranes and like devices. In many forms of materials handling equipment it is usual to supply much or all of the operating power from electric storage batteries. Such batteries, commonly supplying energy at 24 volts, for example, operate D.C. motors to propel lift trucks, to operate hydraulic pumps and to perform a variety of similar functions. In order to provide the largest starting torque in the smallest package, such systems generally employ D.C. series motors. Speed control of a D.C. series motor usually is obtained in the prior art by a form of amplitude modulation, the varying of the applied voltage to the motor, most commonly by inserting and successively shorting out a plurality of accelerating resistors in series with the motor. Unless an extremely large number of finely graduated accelerating resistors are provided, which also requires many contactor switches, motor acceleration frequently is not smooth. Secondly, if a motor system frequently operates in "stop and go" fashion, with frequent stopping and reversals, a large amount of power is dissipated in the accelerating resistors. Acceleration is especially jerky, of course, under light load conditions. A heavy load sometimes provides enough intertia to provide smooth acceleration, but then power dissipation during acceleration is especially high. Thirdly, series motor efficiency itself is a function of motor rated voltage, and because low motor voltage results in low motor efficiency, the overall efficiency in a device such as a lift truck may be very low. In the case of a lift truck, low efficiency limits the number of hours a truck can be used before it must be taken out of service to recharge its batteries.

Because such speed control by variation of the amplitude of applied voltage results in the above described waste of energy, various attempts have been made in the prior art to vary the amount of energy applied from the power source to a series motor supplied therefrom. Such prior art attempts have involved either "pulse width modulation" or "time ratio control." Pulse width modulation is intended to mean those systems which provide pulses of varying width at a constant repetition rate, while time ratio control is intended to mean those systems which provide pulses of a uniform width at a varying repetition rate. In the present invention pulse width modulation is preferred over time ratio control in order to minimize high frequency losses, as will be explained below.

Thus it is a primary object of the invention to provide an improved stepless motor control system for armature current control of a series motor or a compound wound motor of the direct current type.

It is a further object of the invention to provide a stepless D.C. motor speed control capable of operation over a wide speed range.

It is a particular object of the present invention to provide a speed control of the mentioned type which is economical and efficient, and which wastes or dissipates a minimum amount of power.

It is an additional object of the invention to provide a speed control of the mentioned type which is simple and reliable, and which does not require a specially constructed motor.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature, and objects of the invention reference should be had to the following detailed description taken in connection with the accompanying drawings in which.

Figure 1:
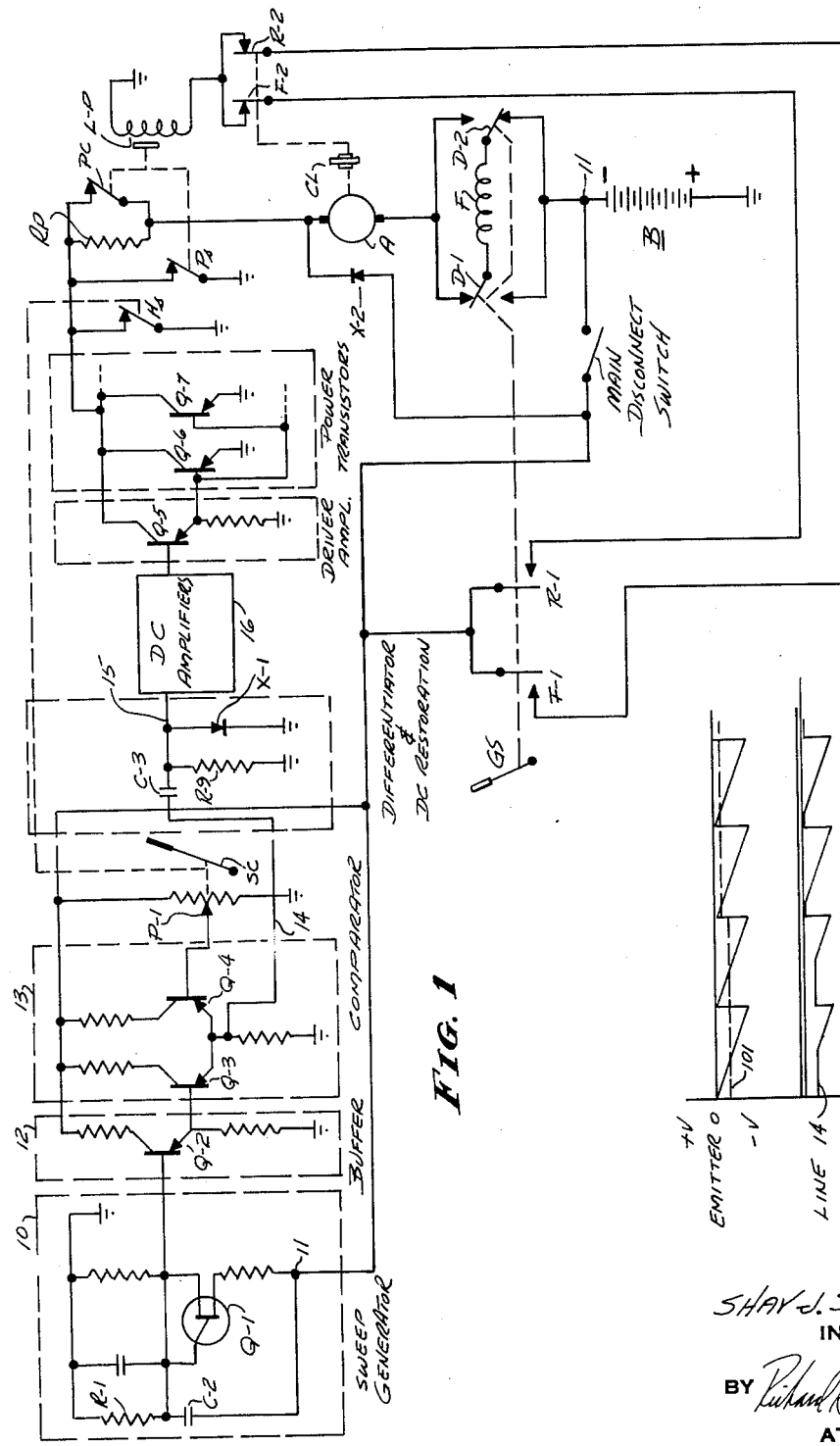
FIG. 1 is an electrical scematic diagram illustrating one embodiment of the invention.
Figure 2:
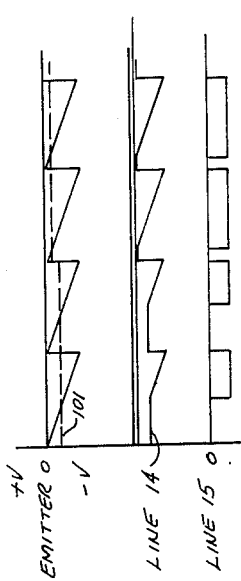
FIG. 2 is a group of waveform diagrams useful in understanding the operation of the invention.

In FIG. 1 a very simple sweep generator shown within dashed lines at 10 comprises a unijunction transistor Q-1 which provides a recurrent ramp or sawtooth voltage at a constant frequency determined by the time constant of resistor R-1 and capacitor C-2. As soon as power is connected to terminal 11 from the power supply (shown as comprising battery B), capacitor C-2 begins to charge up at rate determined by resistor R-1 and capacitor C-2. When the voltage across capacitor C-2 reaches a certain value, unijunction transistor Q-1 conducts, discharging capacitor C-2. A unijunction transistor consists of a bar of n type silicon with an ohmic contact at each end, designated as first and second base contacts, and a third connection, designated the emitter, is made near one end through a small amount of p type material, providing a rectifying function. The unijunction transistor possesses a highly-stable negative-resistance characteristic which makes it useful in a variety of pulse generator circuits. For a more detailed explanation of the use of the unijunction transistor in such circuits, reference may be had to pp. 58 et seq., of "Electronics," May, 1962, McGraw-Hill, New York. Upon conduction of unijunction transistor Q-1 and discharge of capacitor C-2, the sweep generator is at its original condition and another cycle occurs. Four cycles of the sweep generator output voltage at the emitter of transistor Q-1 are shown in FIG. 2. The constant repetition rate ramp voltage output from the emitter of transistor Q-1 of sweep generator 10 is applied via a conventional emitter follower isolation amplifier 12 including transistor Q-2 to a comparator circuit 13 comprising transistors Q-3 and Q-4. In the absence of any input signal to comparator 13 from buffer amplifier 12, the voltage on the emitters of Q-3 and Q-4 will be seen to be determined by the adjustment of the wiper arm of potentiometer P-1, which is shown by way of example as connected to be positioned manually by actuation of the vehicle speed control SC. The base-emitter junction Q-4 will be forward biased, and the voltage on line 14 will closely approximate that on the arm of potentiometer P-1. The base-emitter junction of Q-3 will be seen to be reverse-biased, so that Q-3 will be cut off.

Assume that potentiometer P-1 is adjusted so that the voltage indicated by dashed line 101 in FIG. 2 is present on line 14. As the negative-going sawtooth voltage from Q-2 is applied to the base of Q-3, nothing happens until the base of Q-3 becomes more negative than the Q-2 emitter voltage, at which time the base-emitter junction of Q-3 becomes forward biased, so that Q-3 conducts. When Q-3 conducts, its emitter follows the negative swing of the voltage applied to the Q-3 base, thereby driving line 14 increasingly negative. It will be seen that during each cycle of the sweep generator ramp voltage, line 14 remains at the level determined by the setting of P-1 until the ramp voltage exceeds that level, and then line 14 raises (in a negative direction) with the ramp voltage for the remainder of the cycle, and at the end of the cycle returns to the voltage determined by P-1 when the sweep generator discharges. Thus the time during each cycle that the voltage on line 14 is changing is determined by the adjustment of potentiometer P-1. The ramp voltages provided on line 14 are illustrated in FIG. 2. In FIG. 2 the P-1 setting is indicated at a different, lower negative value for the third and fourth cycles than for the first and second cycles for purposes of illustration. It will be seen that as the voltage on the arm of P-1 is lowered, that larger negative ramp voltages will be obtained on line 14 during a given cycle of the sweep generator, and that the length of the ramp voltage pulses on line 14 will vary linearly with the P-1 setting. Since P-1 may be set to select any voltage between ground and that of the power supply, the time width of the ramp voltages on line 14 may be varied easily and simply from zero width to 100 percent of the width of the sweep generator output pulses. The circuit shown will be understood as the description proceeds to have an important advantage over a number of pulse width modulation systems which cannot be varied over the entire pulse width, and over most time-ratio modulation systems, most of which have a limited dynamic range, i.e., maximum frequency to minimum frequency ratio. It will be seen that the pulse width is determined by the speed reference voltage applied to the comparator by potentiometer P-1, and it should be clearly understood that in some alternative forms of the invention the speed reference voltage may be provided by devices other than a manually-adjusted potentiometer. For example, in some motor systems constructed according to the invention the speed reference voltage may be provided in part or altogether by a conventional tachometer generator or by some other voltage signal producing device responsive to a condition and operative to provide a voltage which varies as a function of desired motor speed.

The ramp voltage pulses of selected width and constant repetition rate on line 14 are applied through a conventional RC differentiating circuit comprising capacitor C-3 and resistor R-9, which converts the ramp pulses to rectangular pulses having a time width corresponding to that of the ramp voltages on line 14, and having very steep, substantially vertical leading and trailing edges. Diode X-1 clips off the positive-going spikes which occur at the end of each pulse and references the negative-going pulses on line 15 to ground, thereby providing a D.C. restoration function. The time-modulated rectangular pulses on line 15 are amplified by means of conventional direct-coupled amplifier stages shown in block form at 16 to provide an input signal to a driver amplifier comprising transistor Q-5. The rectangular pulses on line 15 are D.C. restored, or referenced to zero potential in order that the amplitude of the pulses fed to amplifiers 16 be constant rather than varying with pulse width.

The series motor field winding F and armature A are connected from the power supply terminal 11 via a plurality of power transistors, only two of which (Q-6, Q-7) are shown, to ground, to which the opposite terminal, the positive terminal of the power supply is connected. The switching transistors function as a switch which has either a very high resistance or a very low resistance, depending upon the driving current applied to the switching transistor bases. When the bases of power transistors Q-6 and Q-7 are driven sufficiently negative, power transistors Q-6 and Q-7 are saturated, and substantially the full power supply voltage is connected across the motor. When the power transistor base voltages are at ground potential, the power transistors are cut off, effectively disconnecting the motor armature from the ground return circuit. Inasmuch as the pulses applied to the bases of the power transistors have extremely steep (substantially vertical) leading and trailing edges, i.e., very small rise and fall times, the voltage applied to the series motor is either zero or the full supply voltage, and since the width of the rectangular pulses on line 15 are determined by the setting of potentiometer P-1, the time during each cycle of sweep generator 10 that voltage is applied across the motor is determined by the setting of potentiometer P-1, thereby varying the average current applied to the motor, the average motor torque and the motor speed. While two parallel-connected power transistors are shown in FIG. 1, the exact number of transistors which will be used in a given application will depend, of course, on the maximum current requirements of the motor, and in typical applications perhaps five or six power transistors may be connected in parallel.

A very important feature of the invention is that the collector of driver transistor Q-5 is not connected to the power supply through a load resistor, but instead returned to the power supply through the motor. Because the switching transistors inherently present a low input impedance to driver amplifier transistor Q-5, the driver amplifier necessarily must provide a high output current, and if the collector of driver amplifier transistor Q-5 were returned to power through a load resistor, a considerable amount of power necessarily would be dissipated in the load resistor. By returning the driver amplifier transistor to the power supply through the motor rather than through any load resistor, the considerable power which normally would be dissipated in the load resistor is saved, significantly increasing the motor system efficiency. In a typical lift truck application, the accelerating resistors of the prior art dissipated 1200 watts at one-half rated speed, while the wattage lost in systems constructed according to the invention under the same conditions was 300 watts or less.

When the series motor is stopped or stalled, its back E.M.F. is, of course, zero, and hence the Q-5 transistor collector voltage is at a maximum, substantially the power supply voltage. When the motor is running fast, the counter E.M.F. of the motor largely opposes and tends to cancel out the power supply (battery B) voltage, so that a somewhat lower voltage exists between collector and emitter of driver transistor Q-5. Thus driver amplifier transistor Q-5, by virtue of being returned through the motor, has a lower collector voltage, thereby producing less output currents from the Q-5 emitter, when the motor is running fast than when the motor is stalled or running very slowly. During starting and low speed, heavy current operation, the driving voltages necessary to saturate the power transistors are considerably larger than during a running condition after the motor back E.M.F. has built up. Thus the connection of the driver transistor collector back to the power supply through the motor also automatically controls the driver amplifier collector voltage to provide the greater driving currents needed by the power transistors during starting and heavy acceleration conditions.

As well as having an infinite range, the pulse width modulation system of the present invention will be seen to have a further important advantage over variable frequency systems in that the series motor need not be designed to receive a wide range of high frequency currents. For acceptable stepless control in most tractive applications, current pulses must be applied to the motor at perhaps 100 cycles per second, and a speed range of at least 10 to 1 is usually deemed necessary, so that a variable repetition rate, or time ratio control is required to operate at frequencies varying from 100 to 1000 cycles per second or more, and the series motor frequently must be specially constructed to accommodate such a range of frequencies with out overheating. In the invention on the other hand, the pulse repetition rate is maintained constant, and may comprise the lowest frequency deemed necessary for smooth control (100 c.p.s. in the example), so that the design of the motor may be considerably simplified.

A large number of series motor applications require that the motor be reversible, and in FIG 1 the series motor shown is made reversible in a well-known manner by reversal of the connections of field winding F. In FIG. 1 double-pole contactors D–1 and D–2 are shown mechanically connected to be operated directly by operation of a manual control GS, to close the contactors to the positions shown when control GS is adjusted to its "forward" position, so that current will flow left-to-right through winding F, and conversely, to cause current to flow in the opposite direction through field winding F when control GS is moved in the opposite, or "reverse" direction.

During the periods when switching transistors Q–6 and Q–7 are saturated and current is flowing through the series motor, motor field winding F builds up a magnetic field, and upon cutoff of the switching transistors (Q–6, Q–7, etc.) the collapse of the magnetic field could cause a high "inductive kick" voltage of a polarity opposite to the applied voltage to the motor, and the "inductive kick" voltage conceivably might damage both the switching transistors and the driver transistor. Accordingly, diode X–2 is connected across the motor as shown. Whenever switching transistors Q–6 and Q–7 are conducting, diode X–2 is reverse-biased and does not conduct any current. However, diode X–2 will be forward biased by any "inductive kick" voltage which begins to build up, and the conduction of diode X–2 effectively loads down or shorts out the inductive kick, so that a dangerously high voltage never builds up, thereby protecting both the driver amplifier transistor Q–5 and the switching transistors, Q–6, Q–7.

A number of series motor applications require that the motor be capable of being "plugged," which ordinarily will draw somewhat more current than the motor starting or stall current. Inasmuch as "plugging" ordinarily is used for intentional sudden reversals, which are inherently step-type accelerations, the step-less transistor control of the motor is unnecessary for plugging, and if the switching transistors are not required to handle plugging level currents a lesser number of switching transistors need be paralleled for a given application. In FIG. 1 a plug short switch $P_s$ is shown connected in parallel with switching transistors Q–6 and Q–7, to cause all motor current to by-pass the switching transistors whenever the motor is plugged. A further normally-closed plugging switch $P_c$ shown ganged to switch $P_s$ is shown connected across resistor R–P to open and insert the resistance R–P into the motor circuit to limit the motor current when the motor is plugged. In a typical application, plugging switches $P_s$ and $P_c$ may be operated as shown, by a magnetic plugging relay L–P which is connected to be operated by pairs of contacts $F_1$, $F_2$, $R_1$ and $R_2$. Contacts F–2 and R–2 are mechanically connected through a slip-friction means shown as comprising slip clutch CL, to the motor (or alternatively to the wheels of the truck) so that contact F–2 will be closed when the motor is running forward and contact R–2 will be open, so that contact R–2 will be closed when the motor is running in reverse direction and contact F–2 will be open, and so that both F–2 and R–2 will be open when the motor is stopped. Contacts F–1 and R–1 are connected to operated by the manual direction control GS, to close contact F–1 when control GS is adjusted to its "Forward" position and to close contact R–1 when the control is adjusted to it "reverse" position. Thus, if the truck is traveling forward and control GS is adjusted to its reverse position, current will be applied via contacts R–1 and F–2 to operate plugging relay L–P. Conversely, if the truck is travelling in reverse and control GS is adjusted to its "forward" position, current will applied through contacts F–1 and R–2 to operate plugging relay L–P. If, however, manual control GS is not operated to call for motor operation in a direction opposite to its then direction of rotation, neither of the two mentioned paths to to the coil of plugging relay L–P will be completed, and hence plugging relay L–P will not be operated. During a plugging operation, as soon as the truck motor slows to zero speed during its reversal of direction, the opening of either contact F–2 or R–2 will de-energize relay L–P, and acceleration will occur thereafter in the same manner as during a start from a dead stop.

In a number of series motor applications, including, for example, most traction motor systems, the motor, after being accelerated, may be run at full speed for a appreciable length of time. Since running at constant speed itself does not require any form of step-less control, it frequently becomes highly advantageous to provide a further switch in parallel with the switching transistors, to by-pass all motor current around the switching transistors, to by-pass all motor current around the switching transistors during high speed operation and thereby to allow the switching transistors to cool during such times. In FIG. 1 contact $H_s$ is shown connected across the switching transistors for such a purpose. In a typical application contact $H_s$ is mechanically ganged to the same manual control SC which adjusts potentiometer P–1, so that as potentiometer P–1 is driven downwardly to increase motor speed, contact $H_s$ will close at or near the P–1 wiper position which causes maximum width pulses, and thereafter remain closed if the control is moved slightly further to a limit position.

It will be apparent to those skilled in the art that the present invention may be used in combination with a variety of other previously-known motor circuits as well as in the basic series motor circuit shown. For example, the present invention may be utilized where plural motors are sequentially connected in series and then in parallel, where armature shunts are used to effect speed control, where a variety of differtnt known reversing and plugging systems are used, and in various generator-fed motor systems.

While the invention has been disclosed in a traction motor system, such as might be used in a battery-powered lift truck, it should be noted that the invention is applicable as well to a variety of other direct-current armature current control motor applications not involving traction. While the invention has been disclosed in connection with systems for controlling simple series motors, it will be apparent now to those skilled in the art that the main features of the invention are applicable as well to control of the armature current of a variety of known different motors, including various compound-wound motors and various shunt motors which also use armature current control. In fact, the invention can even be used to control the current in a shunt field winding to control shunt motor speed, although the fact that shunt field currents are usually so much smaller than armature currents usually makes the economy advantages of the invention then much less important. An extreme variety of armature current controlled direct current motor systems exists, both with and without auxiliary shunt fields, and the invention will be recognized by those skilled in the art to be applicable to such systems in light of this disclosure. If the invention is used for field current control of a large shunt motor, for example, the inductance of the field winding easily will average out the current pulses supplied to it by the invention so that no zero field current runaway condition will result even though field current technically will be cut off during a portion of each sweep generator cycle. And, as will be evident to those skilled in the art, use of the invention to drive a shunt motor field will involve speed control opposite to that of the series motor example shown, in that a decrease in switching transistor current will cause an increase in motor speed rather than a decrease in motor speed. It also will be evident at this point that two transistor switching circuits constructed according to the invention may be used together, with one connected to control armature current and one connected to control a shunt field current, with the speed control potentiometers of the two systems ganged together, if desired.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A variable-speed direct-current motor control system, comprising, in combination: a direct current power source having first and second terminals; an armature current controlled motor having an armature and a series field connected in series between said first terminal of said power source and a third terminal; a power transistor switching circuit having a plurality of switching transistors connected in parallel, the collector-emitter circuit of each of said switching transistors being connected between said third terminal and said second terminal of said power source; a driver amplifier transistor having its collector-emitter circuit connected directly to said third terminal and through a resistance to said second terminal of said power source, the output signal from said amplifier transistor being connected to control said plurality of switching transistors; and a controllable pulse width generator operable to apply pulses of varying time duration to said driver amplifier transistor, said controllable pulse width generator comprising means for generating a recurrent sawtooth voltage at a selected repetition rate, means for providing a controllable reference voltage, voltage comparator means for comparing said sawtooth voltage and said reference voltage and for providing an output voltage during each cycle of said sawtooth voltage when said sawtooth voltage exceeds a predetermined percentage of said reference voltage, and differentiating and amplifying means for amplifying and differentiating said output voltage with respect to time to provide said pulses of varying time duration to said driver amplifier transistor.

2. Apparatus according to claim 1 in which said means for providing said controllable reference voltage comprises a potentiometer having a resistance element connected across said power source and a wiper arm movable to vary said controllable reference voltage, thereby to vary the average current applied to said motor.

3. Apparatus according to claim 2 having a manual speed control device connected to position said wiper arm of said potentiometer with respect to said resistance element; and an electrical switch mechanically connected to be operated by said manual speed control device to connect said switch across said collector-emitter circuits of said switching transistors at a predetermined range of adjustment of said manual speed control device.

4. A variable-speed direct-current motor control system, comprising, in combination: a direct current power source; an armature current controlled motor having an armature and a field winding connected in series; a transistor switching circuit, said power source, said motor and said switching circuit being connected in a series loop; a driver amplifier transistor having its collector-emitter circuit and a resistance in series with said collector-emitter circuit connected directly in parallel with said transistor switching circuit whereby all current flowing through said collector-emitter circuit flows through said motor; a controllable pulse width generator operable to apply pulses of varying time duration to said driver amplifier transistor; second switching means responsive to operation of a direction control; third switching means operated by said motor and responsive to the instantaneous direction of rotation of said motor; and four switching means responsive to the combined operation of said second and third switching means and operable to short out said transistor switching circuit during plugging of said motor.

References Cited by the Examiner

UNITED STATES PATENTS

| 2,782,355 | 2/57 | Wilcox | 318—318 X |
| 2,885,621 | 5/59 | Brown | 318—373 |
| 3,064,175 | 11/62 | Vergez | 318—341 |
| 3,092,766 | 6/63 | Hansen | 318—341 |

ORIS L. RADER, *Primary Examiner.*